(12) United States Patent
Rooney (10) Patent No.: US 9,751,133 B2
(45) Date of Patent: Sep. 5, 2017

(54) ORTHOGONAL DRILL AND TAP GUIDE HAVING DOUBLE V-NOTCH GROOVE AND ALIGNMENT MARKS

(71) Applicant: Bruce Patrick Rooney, Louisburg, KS (US)

(72) Inventor: Bruce Patrick Rooney, Louisburg, KS (US)

( * ) Notice: Subject to any disclaimer, the term of this patent is extended or adjusted under 35 U.S.C. 154(b) by 158 days.

(21) Appl. No.: 14/685,600

(22) Filed: Apr. 14, 2015

(65) Prior Publication Data

US 2016/0303661 A1   Oct. 20, 2016

(51) Int. Cl.
*B23B 49/02* (2006.01)
*B23B 47/28* (2006.01)

(52) U.S. Cl.
CPC ............ *B23B 49/02* (2013.01); *B23B 47/281* (2013.01); *B23B 2247/18* (2013.01); *Y10T 408/567* (2015.01)

(58) Field of Classification Search
CPC ......... Y10T 408/56245; Y10T 408/563; Y10T 408/567; B23B 47/28; B23B 47/281; B23B 47/287; B23B 49/02; B23B 2247/14; B23B 2247/18
See application file for complete search history.

(56) References Cited

U.S. PATENT DOCUMENTS

| | | |
|---|---|---|
| 550,767 A | 12/1895 | Thielscher |
| 1,153,841 A | 9/1915 | Earle |
| 2,008,436 A | 7/1935 | Cross |
| 3,589,825 A * | 6/1971 | Wojcik ...................... B23G 1/48 408/241 R |
| 3,804,546 A * | 4/1974 | Boyajian ................. B23B 49/02 408/115 R |
| 4,005,945 A | 2/1977 | Gutman |
| 4,060,333 A | 11/1977 | White |
| 4,256,420 A | 3/1981 | Day |
| 4,375,341 A * | 3/1983 | Schulze .................. B23B 47/28 408/111 |
| 4,390,309 A * | 6/1983 | Fangmann ........... B25H 1/0071 248/667 |
| 4,712,950 A | 12/1987 | Reynolds |
| 5,662,150 A * | 9/1997 | McCray ................ B23B 47/287 144/144.51 |
| 5,800,099 A | 9/1998 | Cooper |
| 7,131,796 B2 * | 11/2006 | Rooney ................... B23B 47/28 408/115 B |

(Continued)

FOREIGN PATENT DOCUMENTS

| | | | |
|---|---|---|---|
| CA | 2191255 | 5/1998 | |
| DE | 19906355 A1 * | 9/2000 | ........... B23B 47/281 |

(Continued)

*Primary Examiner* — Daniel Howell
(74) *Attorney, Agent, or Firm* — Mashburn Law Office, LLC; Donna Denise Mashburn Chapman (57) ABSTRACT

A drill and/or tap guide, adapted for use in machining a straight hole through a variety of workpieces, defining a plurality of standard diameter-sized guide holes, presenting orthogonal sides and surfaces, and a plurality of alignment lines that cooperatively facilitate alignment of the guide and workpiece, and further presenting a double-V clearance notch that facilitates use with angular and curvilinear workpieces, and removal of extrusion and chips during drilling.

17 Claims, 5 Drawing Sheets

(56) References Cited

U.S. PATENT DOCUMENTS

| | | | |
|---|---|---|---|
| D546,212 S * | 7/2007 | Rooney | D10/64 |
| 8,128,321 B2 * | 3/2012 | Quinn | B23B 47/281 |
| | | | 408/115 R |
| 2012/0243955 A1 * | 9/2012 | Cross | B23B 49/005 |
| | | | 408/72 B |
| 2015/0016907 A1 * | 1/2015 | Frick | B23B 47/287 |
| | | | 408/115 R |

FOREIGN PATENT DOCUMENTS

| | | | |
|---|---|---|---|
| DE | 10231252 A1 | 1/2004 | |
| EP | 1327493 | 7/2003 | |
| FR | 2669251 A1 | 5/1992 | |
| GB | 565456 A * | 11/1944 | B23B 47/28 |
| GB | 661420 A * | 11/1951 | B23B 47/281 |
| GB | 819859 A * | 9/1959 | B25H 1/0078 |
| JP | 2001259912 A * | 9/2001 | |
| WO | WO 0074884 A1 * | 12/2000 | B23B 47/281 |

* cited by examiner

FIG. 1

ORTHOGONAL DRILL AND TAP GUIDE HAVING DOUBLE V-NOTCH GROOVE AND ALIGNMENT MARKS

CROSS-REFERENCE TO RELATED APPLICATIONS

This patent application claims priority to, and benefit from U.S. Design patent application Ser. No. 29/257,108, entitled "DRILL AND TAP GUIDE," filed on Dec. 7, 2013, and issued as U.S. Pat. No. D546,212 S, the entirety of which is hereby incorporated by reference.

BACKGROUND OF THE INVENTION

1. Field of the Invention

The present invention relates to a device used to aid the machining of a workpiece, and more particularly, to a device that aids drilling and tapping straight holes in workpieces, including workpieces presenting nonplanar (e.g., angular, curvilinear, etc.) engagement surfaces.

2. Discussion of the Prior Art

It is often desirous to produce straight and accurately located holes in workpieces or parts, particularly, when later joining such parts to form a structural assembly. To accomplish this end, guides have long been developed to aid in the art of drilling and tapping workpieces, when not using a drill press. They typically define standard diameter-sized guide holes, each operable to receive, and a height operable to guide, at least a portion of a drill or tap tool (e.g., a drill bit) during manual machining. Conventional guides, however, have presented concerns relating to alignment and application. For example, it is appreciated by those of ordinary skill in the art that conventional guides, while offering guidance to the tool, are often difficult to properly align with the desired target point on the workpiece. Further, with respect to nonplanar configurations, conventional guides typically offer one-size-fits-all solutions that limit their application. Of yet further concern, conventional guides typically offer little room for the removal of extrusions or chips produced during drilling, which may compromise the quality of the hole.

As such, there remains a need in the art for an improved drill and/or tap guide that facilitates accurate manual alignment of a guide hole and targeted point on the workpiece, increases the applications for which the guide may be used, and facilitates removal of extrusions or chips during drilling.

BRIEF SUMMARY OF THE INVENTION

Responsive to the aforementioned concerns, the present invention provides an improved drill and/or tap guide that offers several novel features, including orthogonal sides, and alignment lines or marks for facilitating proper alignment with a workpiece. As such, the inventive guide is useful to effect more precise and facile manual machining of straight through-holes and borings. By facilitating manual alignment, the invention reduces the required skill level of the operator, as well as the need for appurtenant tooling. Further, the present invention features a double-V clearance notch that increases the variety of applications for which a single guide may be used. For example, it is appreciated by those of ordinary skill in the art that the present guide facilitates use with a greater number of tubular and square workpiece configurations, in comparison to prior art guides. The inventive double-V notch is further useful to produce straight borings within the sides/ends of panels, such as hard wood flooring. The notch configuration offered is yet further useful for facilitating the removal of extrusions or chips during drilling, which reduces the need to repetitively unclamp and re-clamp the guide during a project. With respect to tapping, it is appreciated that the inventive guide reduces the likelihood that the tap will be broken or have its integrity otherwise compromised.

More particularly, the present invention presents a drill and tap guide adapted for use with a drill and/or tap tool and a workpiece presenting a targeted point. The guide comprises an elongated body having top and bottom surfaces, and first and second sides defining a longitudinal axis, and further having first and second ends defining a lateral centerline. The body defines a plurality of drill and tap holes extending through the top and bottom surfaces. Each hole has a unique diameter, and more preferably, a standard diameter-sized drilling or tapping diameter. The body and holes are configured to entrain at least a portion of the tool without distortion to the tool or body. At least a portion of the sides are generally planar and parallel, so as to define a generally constant width dimension. The ends define first and second generally planar and parallel surfaces; and at least a portion of the end surfaces and sides are generally orthogonal.

In other aspects of the invention, the guide further defines a double-V positioning/clearance notch formed in the bottom surface and generally parallel to the longitudinal axis of the body. The notch is configured to aid in aligning the body and workpiece by receiving at least a portion of the workpiece within the notch. The body yet further presents a plurality of alignment lines or marks that intercept or run parallel to the central axis defined by at least one hole, so as to further aid in aligning the body and workpiece by facilitating the placement of the targeted point on the central axis of a hole.

Other advantages, benefits and features of the present invention will become apparent to those skilled in the art upon reading the detailed description of the preferred embodiment of the invention as discussed below.

BRIEF DESCRIPTION OF THE SEVERAL VIEWS OF THE DRAWINGS

A preferred embodiment of a drill and tap guide is described in detail below with reference to the drawing figures shown in exemplary scale, wherein.

DETAILED DESCRIPTION OF THE
PREFERRED EMBODIMENT

The following description of the preferred embodiments is merely exemplary in nature and is in no way intended to limit the scope of the invention, its application, or uses. As shown in FIGS. 1-9, an inventive drill and/or tap guide 10 is adapted for use with a machining tool 11, such as a manual tap or drill tool, and by an operator (not shown) to effect the afore-mentioned benefits when machining a through-hole or boring within a workpiece 100. The illustrated and described embodiment(s) of the guide 10 is provided to convey the inventive aspects of the invention.

Figure 1:
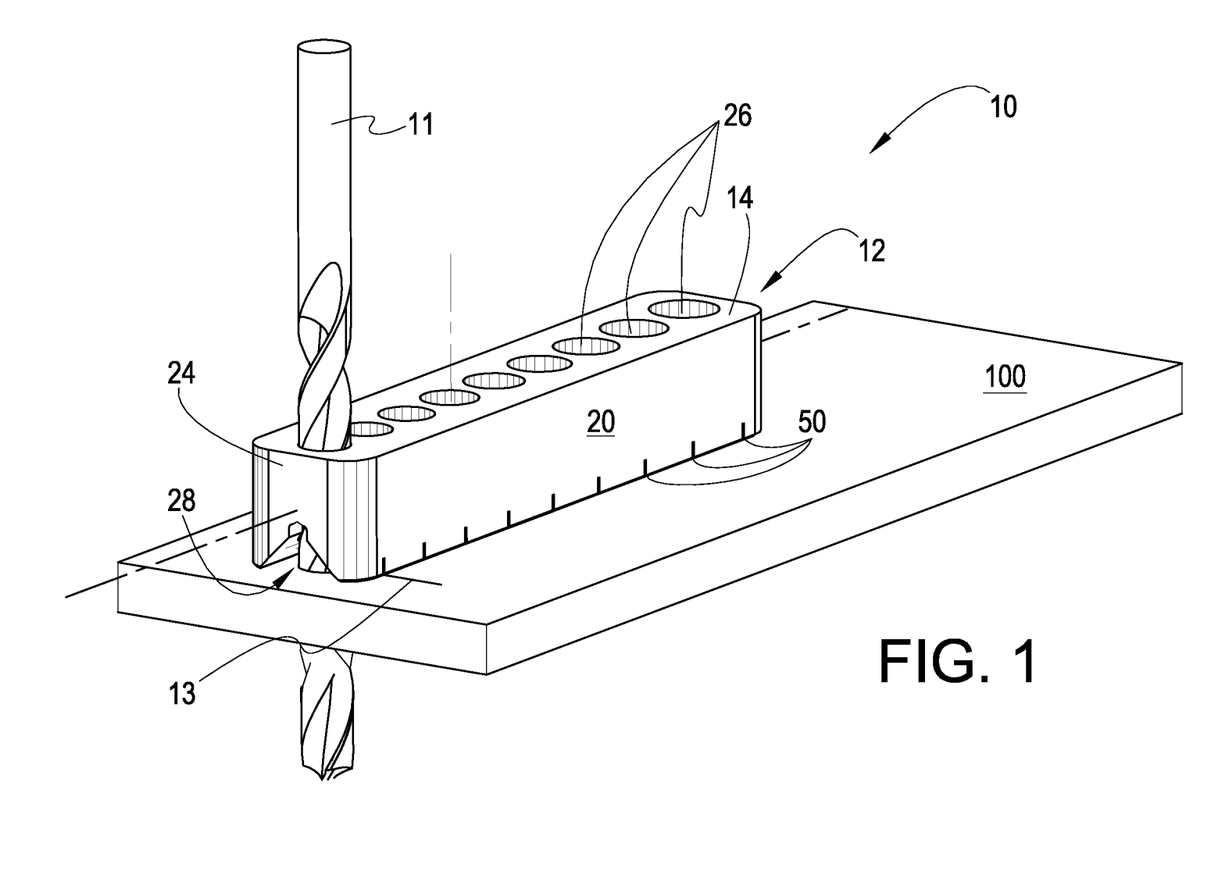
FIG. 1 is a perspective view of a drill and/or tap guide, entraining a drill bit as it perforates a planar workpiece, in accordance with a preferred embodiment of the invention.

The preferred guide 10 is presented by an elongated body 12 having top and bottom surfaces 14,16, first and second sides 18,20, and first and second ends 22,24. The body 12 is constructed from a material suitable for use, such as a metallic material (e.g., nickel alloyed steel (heat treated for added durability)) that will not distort or damage the tool 11 or allow the tool 11 to distort or damage the body 12. The body 12 defines a longitudinal axis (FIG. 1), and a plurality of standard diameter-sized holes 26 for receiving and entraining at least a portion of the tool 11 (e.g., drill bit, tap and die set, etc.), wherein a notable standard is ANSI, and diameter sizes may or may not be in metric. Each hole 26 defines a central guide hole axis (FIG. 1). In a first aspect of the invention, at least one, and more preferably both of the sides 18,20 are generally (e.g., at least 50%, more preferably at least 75%, and most preferably 100%) planar and parallel, so as to define a generally constant width dimension (FIG. 3); the ends 22,24 define first and second generally planar and parallel surfaces (FIG. 3); and the ends 22,24 and sides 18,20 are generally orthogonal. More preferably, the ends 22,24 and sides 18,20 are also perpendicular to the top and bottom surfaces 14,16, such that the guide generally presents a rectangular cube (FIG. 2-6).

Figure 2:
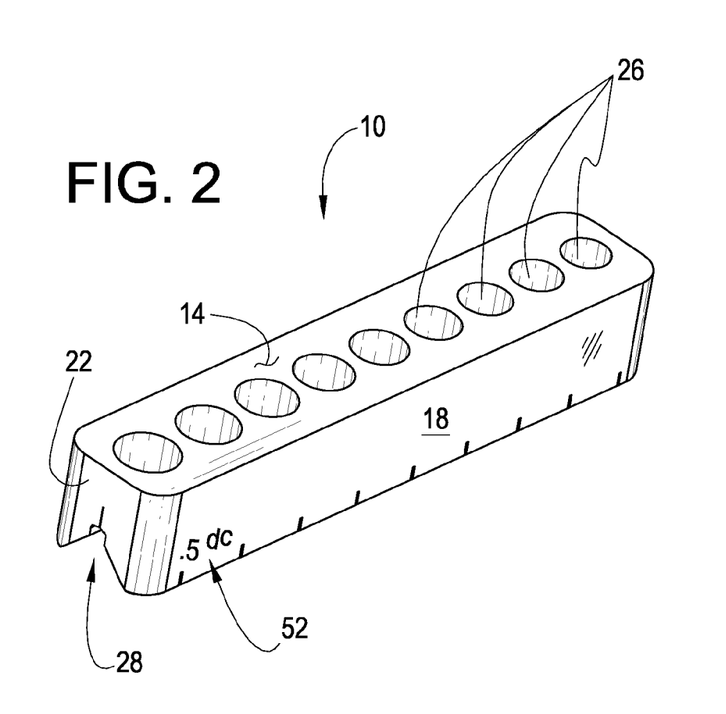
FIG. 2 is a perspective view of the guide shown in FIG. 1.

The flat and parallel surfaces, it is appreciated, facilitates the alignment of the guide 10, where cross-hairs, straight edges, T-squares, and otherwise formed straight lines 13 are used to position the guide 10 (FIG. 1). In a preferred method of operation, the distance from a side 18,20 or end 22,24 to the central axis of an adjacent hole 26 is predetermined to within acceptable tolerance, and indicated (FIG. 2). The operator can then use the distance to locate the central axis, by placing the side or end on a temporary demarcation marked said distance from the targeted point on the workpiece. By positioning each central axis along the longitudinal axis, only one distance-to dimension need be provided from a side or end (FIG. 2).

It is appreciated that those of ordinary skill in the art may make alterations or additions to the illustrated embodiment without departing from the inventive concepts encompassed herein. For example, it is appreciated that the pattern, height, and/or diameters of the holes 26 may be changed to effect a guide better equipped for a given application or a wider variety of applications. That is to say, a guide 10 may present differing sets, sizes, patterns, and configurations of drill and/or tap holes then the illustrated embodiment, depending upon intended use. Moreover, not all of the sides 18,20 and ends 22,24 need be flat, and at least one may be curved for ergonomic reasons; and the body 12 may provide chamfered, and/or filleted edges to further promote handling. For example, in the illustrated embodiment, the ends 22,24 feature filleted edges (FIG. 3), with only a central portion straddling the lateral centerline being flat. Finally, consistent with the teachings of the present invention, it is appreciated that the body 12 may be aggregately formed of a first material, such as a transparent solid (not shown), and inserts (also not shown) that are embedded within the first material, define the holes 26, and are formed of a second more durable (e.g., metallic) material.

Figure 3:
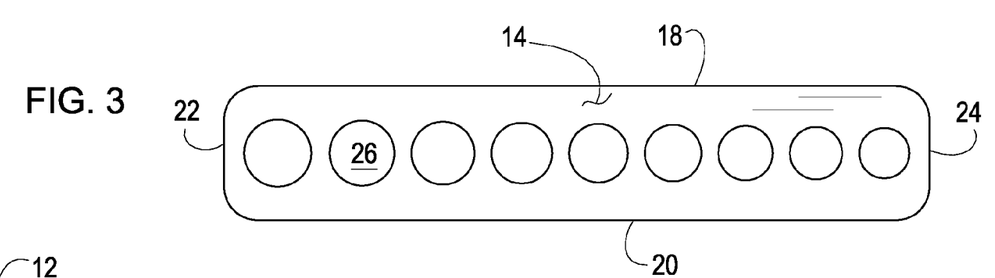
FIG. 3 is a top view of the guide shown in FIG. 1.
Figure 4:
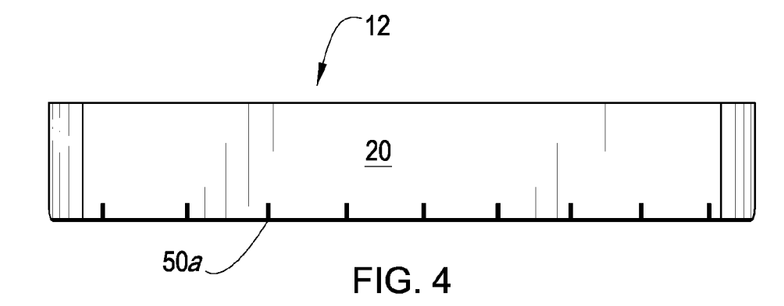
FIG. 4 is a side elevation of the guide shown in FIG. 1.

More particularly, the plurality of cylindrical guide holes 26 are formed through the body 12, preferably perpendicular to the top and bottom surfaces 14,16. The preferred guide holes 26 each have a unique diameter preferably operable to receive a standard diameter sized tool 11 with minimal, e.g., less than 3%, more preferably less than 2%, and most preferably less than 1%, clearance, as measured from the outside diameter of the tool 11. The clearance preferably allows for lubrication to be used between the tool 11 and body 12 during machining. The holes 26 present a minimum height sufficient to maintain a straight alignment in (i.e., guide) the tool 11 during machining. Where, for example, a plurality of nine drill holes 26 range from ½ to ⅜ inches in size, the minimum height may be approximately ½ inches. The holes 26 are preferably arranged widest to narrowest from the first end 22 toward the second end 24 (FIG. 3), and may be organized/collated in other configurations as desired. In the illustrated embodiment, a line intersecting the central guide hole axes is parallel with the longitudinal axis of the body 12; and the guide holes 26 are spaced equidistance apart along the longitudinal axis, so as to define uniform intermediate wall thickness (FIG. 3).

Figure 5:
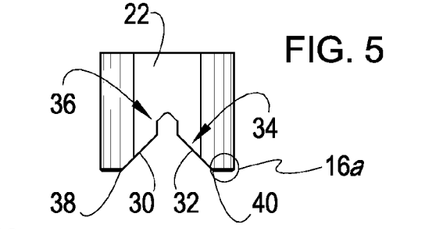
FIG. 5 is an end elevation of the guide shown in FIG. 1.
Figure 6:
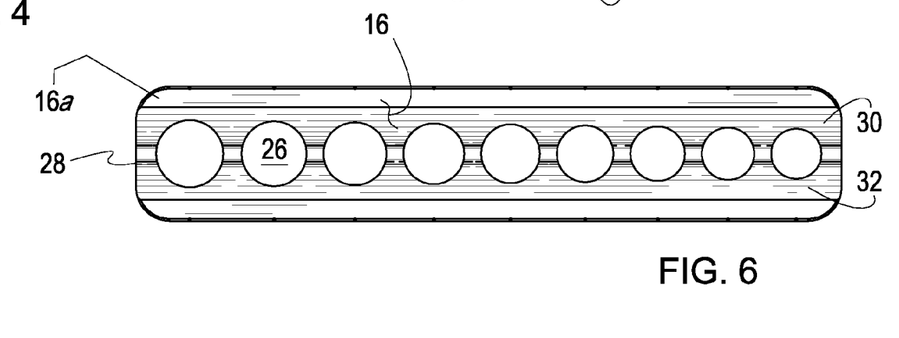
FIG. 6 is a bottom view of the guide shown in FIG. 1.

In another aspect of the invention, a double-V positioning notch 28 is preferably formed in the bottom surface 16 of the body 12 (FIG. 5), and configured to, among other things, promote alignment and more stable engagement with angular and curvilinear (e.g., tubular) workpieces. The illustrated notch 28 runs along and is centered about the longitudinal axis as shown in FIG. 6. The preferred notch 28 is defined by a mirrored pair of sloped walls 30,32, whose cross-section presents a large inverted-V section 34. A smaller inverted-V section 36 is defined at the apex of the large inverted-V section 34, such that the large-V section 34 spaces the bottom surface 16 from the smaller-V section 36. Both the large and smaller-V sections 34,36 are laterally centered, such that their sloped walls work to center an inserted workpiece (FIG. 5). More preferably, the smaller-V section 36 is spaced from the large-V section 34 by interior vertical walls 36a (FIG. 7a); and the preferred walls 36a present a height not less than half the width of the small-V section 36. In alternative embodiments, the notch 28 may have a double-U or semi-circular cross-section. In the illustrated embodiment, the large-V section walls 30,32 form about a ninety degree angle. The walls 30,32 preferably join the bottom surface 16 along notch edges 38,40 (FIG. 8a) spaced from the sides 18,20, so as to form a base 16a preferably parallel to the top surface 14.

Figure 2A:
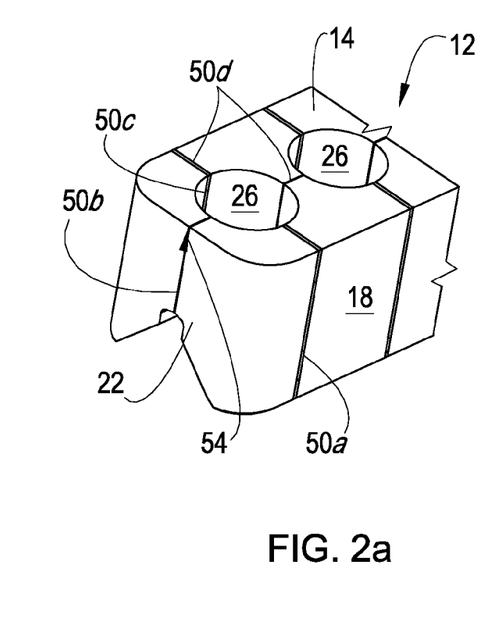
FIG. 2a is a perspective segment of a drill and/or tap guide, particularly illustrating a variety of full length alignment lines, in accordance with a preferred embodiment of the invention.

In another aspect of the invention, the preferred body 12 presents a plurality of demarcations or alignment lines 50 that intercept or run parallel to the central axis of at least one hole 26 (FIGS. 1-2a). The lines 50 aid in aligning the body 12 and workpiece 100 by facilitating the alignment of the targeted point and central axis of the hole 26, for example, by matching with a cross-hair intercepting the point. For example, a line 50a on a side 18,20 may correspond to the intersection of that side and a plane perpendicular to the side and consisting of the central axis of the adjacent hole. Thus, the alignment lines 50 may include a vertical line 50a extending at least partially up a side from the bottom surface 16; and a plurality of vertical lines 50a may be spaced congruently with the central axes of the holes 26.

More preferably, first and second opposite sets of vertical lines 50a, each set extending at least partially up one of the sides 18,20 from the bottom surface 16, may be spaced congruently with the central axes of the holes 20, and aligned with the vertical lines from the other set, such that a horizontal line may be drawn that intercepts one line from each set and a corresponding central axis. Likewise, an alignment line 50b, coplanar with at least one central axis, may extend up an end 22,24 from the bottom surface 16; and/or, at least one vertical line 50c may extend at least partially up an interior wall of each hole 26 from the bottom surface 16 (FIG. 2a). Where the central axes intercept the longitudinal axis (as shown in the illustrated embodiment), an alignment line 50b preferably extends up the lateral centerline of each end from the bottom surface.

The plurality of alignment lines 50 may include at least one horizontal line 50d extending at least partially along (i.e., parallel with the longitudinal axis, or lengthwise) or across the top or bottom surface 14,16 from an end or side, respectively. It is appreciated that a line or demarcation 50 may extend fully up a side or end, and along or across a surface (FIG. 2a), as space/indicia allows. With respect to indicia, it is appreciated that a distance-to-center dimension 52 may be presented associated with (e.g., above) a line 50, to further aid in locating the center of the adjacent hole 26 (FIG. 2). Finally, it is appreciated that alignment lines 50 may converge in thickness until forming a point, present distal arrowheads 54, or present any other configuration operable to increase precision.

In operation, the guide 10 may be used for drilling or tapping a through-hole into a workpiece 100 having a generally flat surface (FIG. 1). Here, the guide 10 is positioned so that the bottom surface 16 of the base 16a contacts the surface of the workpiece 100 into which the through-hole or boring is to be drilled or tapped. In the illustrated embodiment, the base 16a may be about ⅛ inches, and not less than ⅛ inches wide, so as to promote stable engagement with flat workpieces 100. As a result, when the guide 10 rests upon the workpiece 100, the guide holes 26 are perpendicular to the surface of the workpiece 100. The guide 10 is then positioned so that the applicable guide hole 26 of the desired diameter is centered on the position where the hole is to be machined (i.e., the targeted point) via the afore-described alignment provisions of the present invention. By pressing the guide 10 against the workpiece 100 with one hand or a clamp (not shown), the guide 10 is secured in place. The operator may then use the other hand to drill or tap the workpiece 100.

Figure 7:
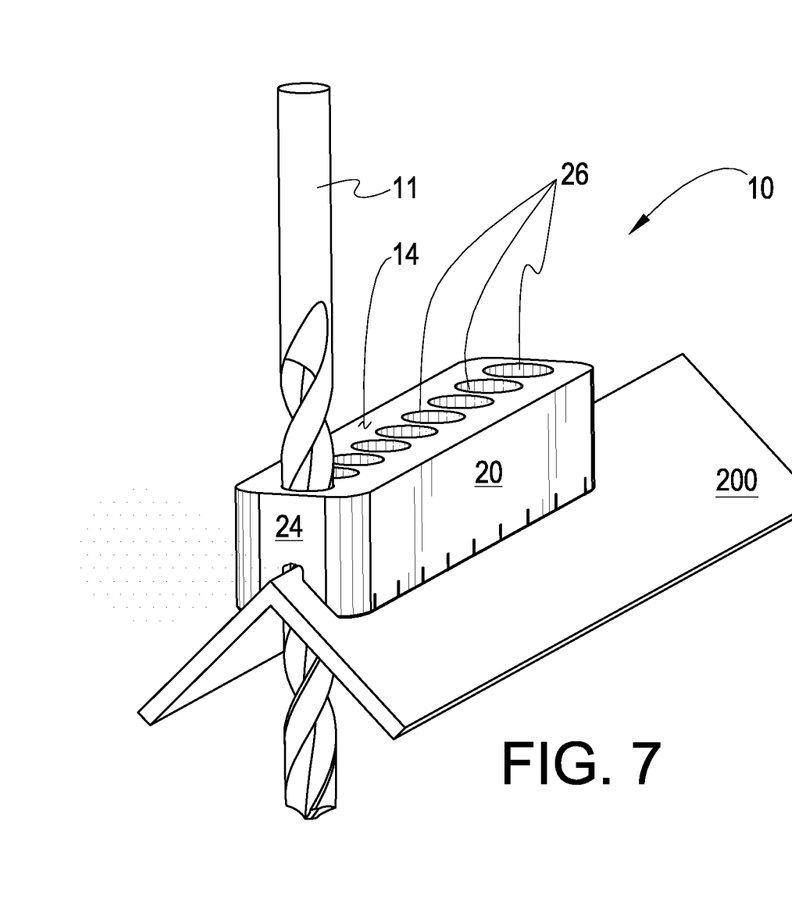
FIG. 7 is a perspective view of the guide shown in FIG. 1, entraining a drill bit as it perforates an angular workpiece.
Figure 7A:
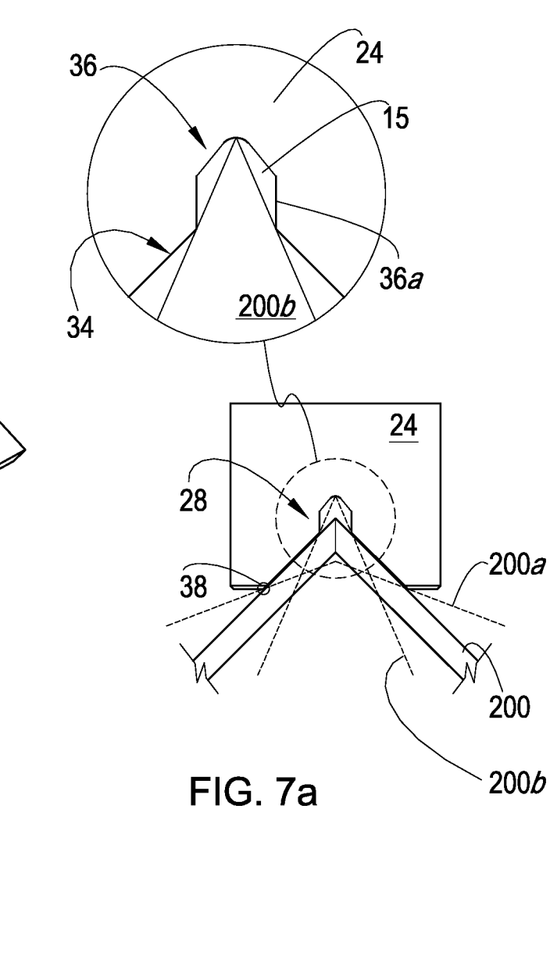
FIG. 7a is an end elevation of the guide shown in FIG. 1, engaging a plurality of differing angular workpiece profiles.
Figures 8, 8A, 9:
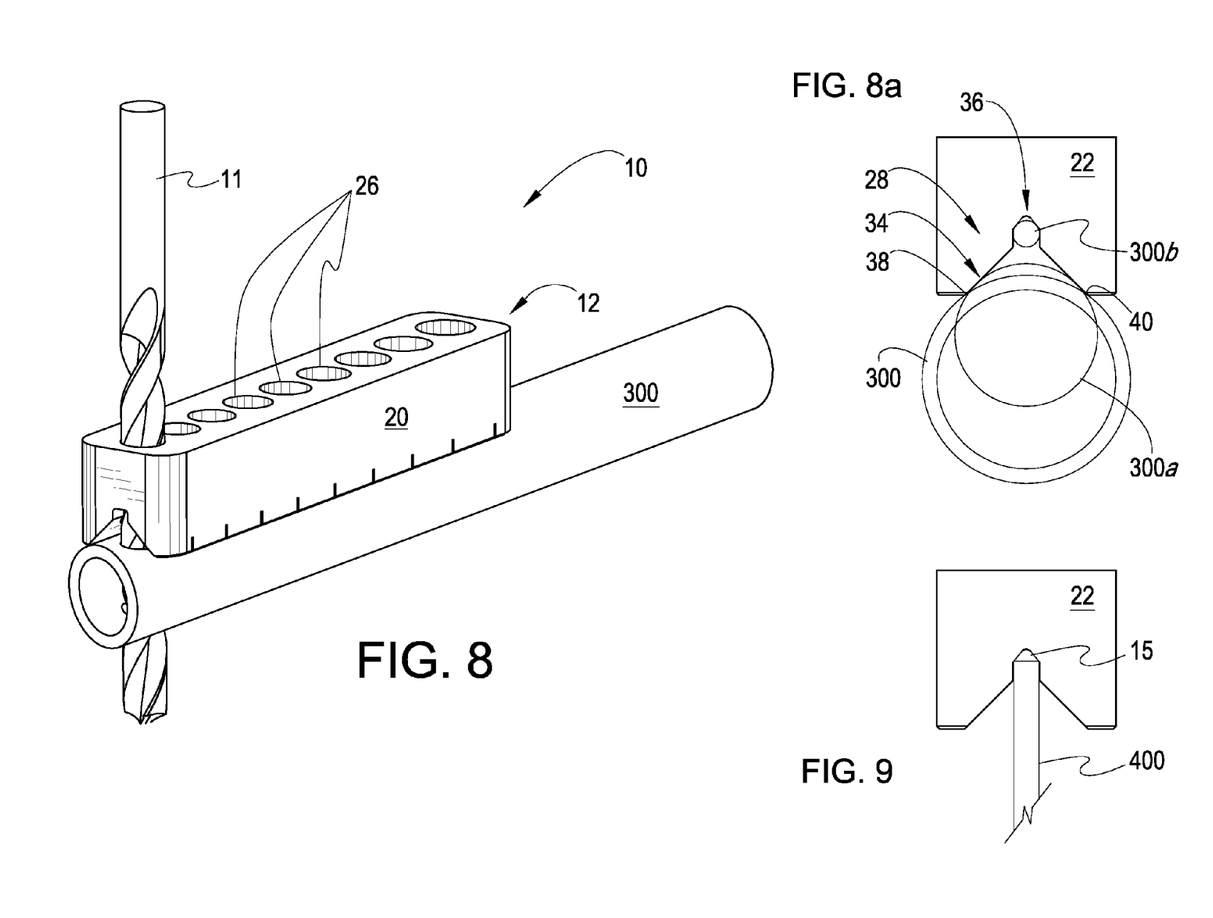
FIG. 8 is a perspective view of the guide shown in FIG. 1, entraining a drill bit as it perforates a tubular workpiece.
FIG. 8a is an end elevation of the guide shown in FIG. 1, engaging a plurality of differing tubular workpiece profiles.
FIG. 9 is an end elevation of the guide shown in FIG. 1, engaging the end of a panel workpiece.

Referring to FIGS. 7-9, the positioning notch 28 may be used to more securely engage the guide 10 to workpieces 200,300 having nonplanar engaging surfaces. In FIG. 7, an angular workpiece 200, such as an angle iron, presents a ninety degree angle wherein at least one through-hole is to be formed. The guide 10 is positioned by placing the edge of the workpiece 200 within the notch 28, and more particularly, within the large-V section 34, as shown. It is appreciated that the guide 10 may be used with angled workpieces of flatter pitch 200a (FIG. 7a) by straddling the edge of the workpiece, and then orienting the guide 10 as desired. Thus, the large-V section 34 of the preferred guide 10 is configured for use in drilling or tapping holes through corners of angle irons where the angle defined by the corner is greater than or equal to the angle between the walls 30,32, in this case ninety degrees. As further shown in FIG. 7a, depending upon the width thereof, the smaller-V section 36 enables the guide 10 to be used with angled workpieces 200b having corners defining an angle less than the angle between the walls 30,32. In this regard, the minimum angle compatible with the guide 10 depends upon the ratio of the relative widths between the sections 34,36 and the height of the small-V section walls 36a, as well as the overall height of the small-V section 36. The gaps 15 formed in-between the small-V section 36 and workpiece 200b enables the removal of extrusion and chips (FIG. 7).

FIG. 8 depicts the guide 10 positioned on a workpiece 300 having a continuous cylindrical wall, such as a tube or rod. Where the tubular workpiece 300 presents a diameter larger than the large-V section 34 width, the edges 38,40 of the notch 28 are positioned, such that the guide 10 is caused to straddle (FIG. 8a), and the central axis of the selected guide hole 26 is perpendicular to the targeted point on the workpiece 300. The guide 10 may then be used, for example, to guide a drill bit 11 through the wall of, or entirely through workpiece 300, so as to form a perpendicular hole. For tubular workpieces 300a having an outside diameter smaller than the spacing of the edges 38,40, but larger than the width of the smaller-V section 36, the workpiece 300a may be nested within the large-V section 34, and brought to bear against the interior sloped walls 30,32 of the large-V section 34, thereby effecting a centered and secure engagement. Again, the smaller-V section 36, in this configuration, acts as a clearance notch that facilitates the removal of extrusion and chips during drilling. For tubular workpieces 300b having outside diameters smaller than the spacing of the smaller-V section 34 (FIG. 8a), the workpiece 300b may be inserted within the smaller-V section 34 and caused to center by the converging walls thereof. It is appreciated that the V's need not be congruent. The vertical walls 36a of the smaller-V section 36 allow a small tubular workpiece 300 to be inserted inside the small-V section 36. Thus, a more stable engagement with small tubular workpieces 300b is provided by the present invention, where a sufficiently small guide hole is selected.

The small-V section 36 also enables engagement with ends of panel workpieces 400 (FIG. 9). The panel 400 may be inserted within the notch 28 and small-V section 36 where dimensions allow. For panels 400 having a thickness less than the width of the small-V section 36, it is appreciated that shims (not shown) or similar devices may be used to center (e.g., placed on opposite sides of) the workpiece 400 as needed. Here, the gap 15 formed above the panel 400 by the small-V section 36 enables the removal of extrusion and chips during drilling.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context (e.g., includes the degree of error associated with measurement of the particular quantity). The suffix "(s)" as used herein is intended to include both the singular and the plural of the term that it modifies, thereby including one or more of that term. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

What is claimed is:

1. A guide adapted for use with a drill and/or tap tool and a workpiece presenting a targeted point, said guide comprising:
    an elongated body having top and bottom surfaces, and first and second sides defining a longitudinal axis, and further having first and second ends defining a lateral centerline,
    said body defining a plurality of standard diameter-sized holes extending perpendicularly through the top and bottom surfaces,
    said body and holes being operable to entrain at least a portion of the tool without distortion to the tool or body,
    said sides being generally planar and parallel, so as to define a generally constant width dimension,
    said ends defining first and second generally planar and parallel surfaces, and said ends and sides being generally orthogonal,
    said body defining a double-V positioning notch formed in the bottom surface and generally parallel to the longitudinal axis of the body,
    said notch being configured to further aid in aligning the body and workpiece by receiving at least a portion of the workpiece within the notch.

2. The guide as claimed in claim 1, wherein the first and second sides and ends are perpendicular to the top and bottom surfaces, such that the body generally presents a rectangular cube.

3. The guide as claimed in claim 1, wherein the center of each hole is located on the axis, each hole has a unique diameter, and the diameters of the holes decrease from the first end toward the second end.

4. The guide as claimed in claim 1,
    said body presenting a plurality of alignment lines that intercept or run parallel to the central axis of at least one hole, so as to aid in aligning the body and workpiece by facilitating the placement of the point on the central axis of a hole.

5. The guide as claimed in claim 1,
    said body further defining a double-V positioning notch formed in the bottom surface and generally parallel to the longitudinal axis of the body,
    said notch being configured to aid in aligning the body and workpiece by receiving at least a portion of the workpiece within the notch,
    said body presenting a plurality of alignment lines that intercept or run parallel to the central axis of at least one hole, so as to further aid in aligning the body and workpiece by facilitating the placement of the point on the central axis of a hole.

6. A drill and tap guide adapted for use with a drill and/or tap tool and an angular or curvilinear workpiece, said guide comprising:
    an elongated body having top and bottom surfaces, and first and second sides defining a longitudinal axis, and further having first and second ends defining a lateral centerline,
    said body defining a plurality of standard diameter-sized holes extending through the top and bottom surfaces,
    said body and each of said holes being operable to entrain at least a portion of a drill and/or tap tool without distortion to the tool or body,
    said body further defining a double-V positioning notch formed in the bottom surface and generally parallel to the longitudinal axis of the body,
    said notch being configured to aid in aligning the body and workpiece by receiving at least a portion of the workpiece within the notch,
    wherein the notch defines a large inverted V, and a smaller inverted V at the apex of the large inverted V, such that the large-V section is intermediate the bottom surface and smaller-V section,
    wherein the smaller inverted V is spaced from the large inverted V by interior vertical walls, and the walls are spaced a width, and present a height not less than half the width.

7. A drill and tap guide adapted for use with a drill and/or tap tool and workpiece presenting a targeted point, and by an operator, said guide comprising:
    an elongated body having top and bottom surfaces, and first and second sides defining a longitudinal axis, and further having first and second ends defining a lateral centerline,
    said body defining a plurality of standard diameter-sized holes extending through the top and bottom surfaces,
    said body and each of said holes being operable to entrain at least a portion of a drill and/or tap tool without distortion to the tool or body,
    said body presenting a plurality of alignment lines that intercept or run parallel to the central axis of at least one hole, so as to aid in aligning the body and workpiece by facilitating the placement of the point on the central axis of a hole,
    said body further defining a double-V positioning notch formed in the bottom surface and generally parallel to the longitudinal axis of the body,
    said notch being configured to further aid in aligning the body and workpiece by receiving at least a portion of the workpiece within the notch.

8. The guide as claimed in claim 7, wherein said plurality of lines includes a vertical line extending at least partially up the lateral centerline of each end from the bottom surface.

9. The guide as claimed in claim 7, wherein said plurality of lines includes at least one vertical line extending at least partially up a side from the bottom surface.

10. The guide as claimed in claim 9, wherein said plurality of lines includes a plurality of vertical lines extending at least partially up a side from the bottom surface, and spaced congruently with the central axes of the holes.

11. The guide as claimed in claim 7, wherein said plurality of lines includes at least one horizontal line extending at least partially along or across the top surface from an end or side respectively.

12. The guide as claimed in claim 7, wherein said plurality of lines includes at least one vertical line extending fully up a side or end, and/or at least one horizontal line extending fully along or across the top surface.

13. The guide as claimed in claim 7, wherein said body further presents a distance-to-center dimension associated with at least one of said plurality of lines.

14. The guide as claimed in claim 7, wherein each hole defines an interior wall, and said plurality of lines includes at least one vertical line extending at least partially up an interior wall from the bottom surface.

15. The guide as claimed in claim 7, wherein at least a portion of the plurality of lines present a distal arrowhead.

16. The guide as claimed in claim 7, wherein said plurality of lines includes a plurality of vertical lines extending at least partially up a side from the bottom surface, and spaced congruently with the central axes of the holes, and further includes at least one horizontal line extending at least partially across or along the top surface from an end.

17. The guide as claimed in claim 7, wherein said plurality of lines includes first and second sets of vertical lines, each set extending at least partially up a side from the bottom surface, spaced congruently with the central axes of the holes, and aligned with the vertical lines from the other set, such that a horizontal line may be drawn that intercepts one line from each set and a central axis.

\* \* \* \* \*